INVENTORS
GAYLORD W. BROWN
DONALD J. RISE
BY
*Learman & McCulloch*
ATTORNEYS

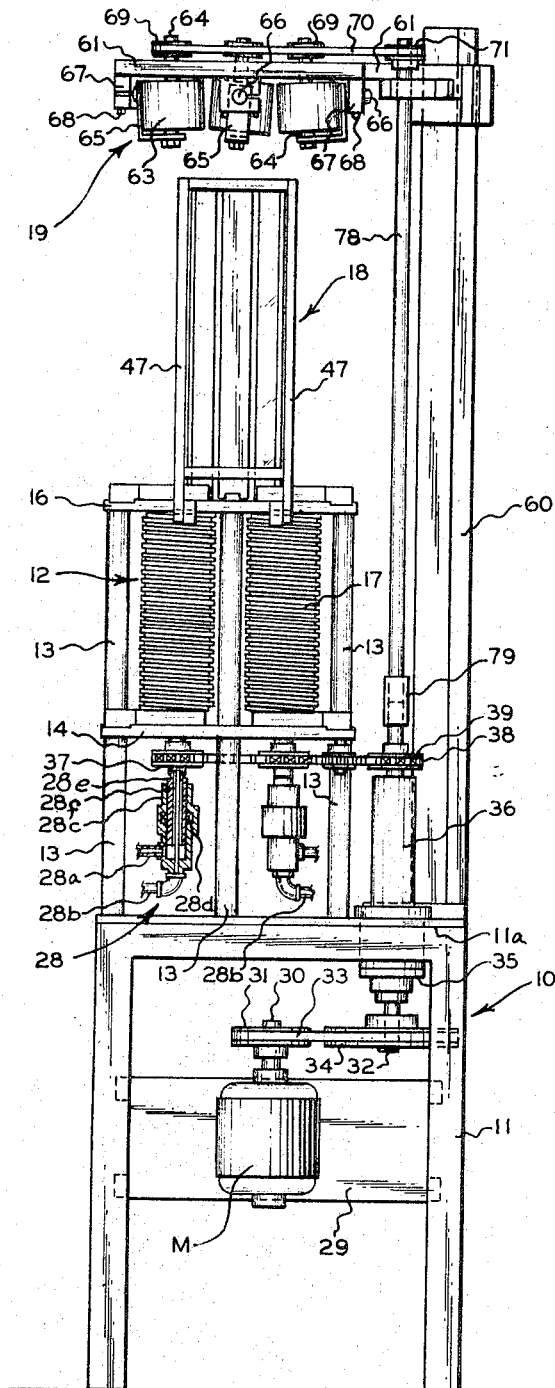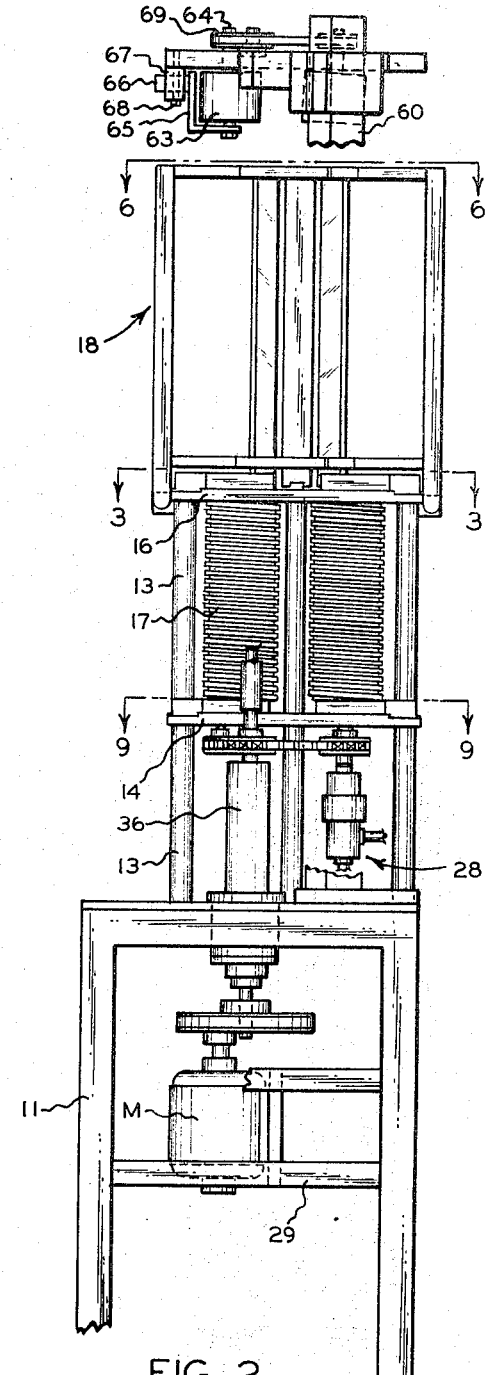
FIG. 1
FIG. 2
INVENTORS
GAYLORD W. BROWN
DONALD J. RISE
ATTORNEYS Aug. 29, 1967  G. W. BROWN ET AL  3,339,005
LIP CURLING METHOD AND MACHINE
Filed May 11, 1964  5 Sheets-Sheet 2

Aug. 29, 1967  G. W. BROWN ETAL  3,339,005
LIP CURLING METHOD AND MACHINE
Filed May 11, 1964  5 Sheets-Sheet 5

INVENTORS
GAYLORD W. BROWN
DONALD J. RISE
BY
*Learman & McCulloch*
ATTORNEYS

United States Patent Office 3,339,005
Patented Aug. 29, 1967

3,339,005
LIP CURLING METHOD AND MACHINE
Gaylord W. Brown and Donald J. Rise, Beaverton, Mich., assignors to Brown Machine Company of Michigan, Inc., a corporation of Michigan
Filed May 11, 1964, Ser. No. 366,389
26 Claims. (Cl. 264—297)

ABSTRACT OF THE DISCLOSURE

A method and machine for forming rolled under lips on plastic containers or the like having side walls terminating in rims and nesting controlling, projection surfaces including: heating the rims of the containers to render them deformable and then feeding a tightly nested stack of the containers spirally as a unit while engaging the rims at a plurality of arcuately spaced locations and progressively curling their rims in toward their side walls.

---

This invention relates generally to machines for curling the flanges on the rims of plastic containers, such as beverage cups and cottage cheese containers, and more particularly, to a new and improved machine and method for performing this operation on a stack of such containers in a progressive manner, and at a high rate of speed.

Prior art machines for curling the rims of cups and containers have taken many forms and most have been of a complex nature and have not been capable of trouble-free, high speed operation. Certain of these prior machines have utilized a plurality of axially parallel, threaded rollers arranged in circumferentially spaced relationship so that a stack of containers could be fed axially between them, the threads of the rollers being employed to curl over the lips of the cups as the containers are fed through the machine from one end to the other. Such machines have been proposed for folding in the terminal edges of the flanges on containers of the type wherein the flange was initially formed with an axially extending return section. However, such machines have not been capable of providing a circular roll wherein the rolled section has substantially a constant radius. Further, in such machines each of the containers, as it proceeded through the machine, was slightly denested from the other containers to allow it to freely rotate with respect to the following containers, and it became difficult to achieve a control of the operation to the extent that a satisfactory curl of the desired quality was obtained on every container passing consecutively through the machine. Still further, such prior art machines have not provided satisfactory results with containers which were formed with straight radial flanges without axial return sections.

One of the prime objects of the present invention is to design a machine to obviate the above-mentioned disadvantages, and utilize certain new concepts in machines of this general character. The machine of the present invention, for instance, provides a precise control which results in the formation of substantially a constant radius curl on each container and operates in a manner such that the rims of the containers are not chewed up or scuffed up in the machine, nor imperfectly formed and wasted.

Another object of the invention is to provide a machine which can be employed either vertically or horizontally, to handle containers progressively.

Figure 3:
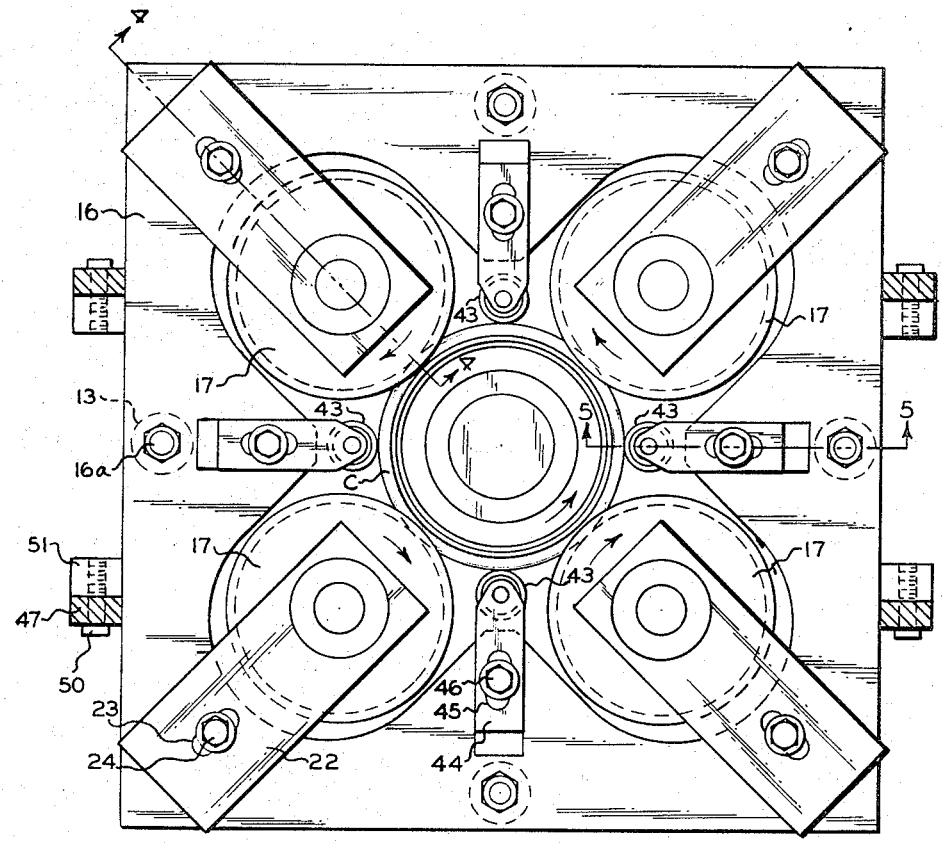
Figures 4, 5:
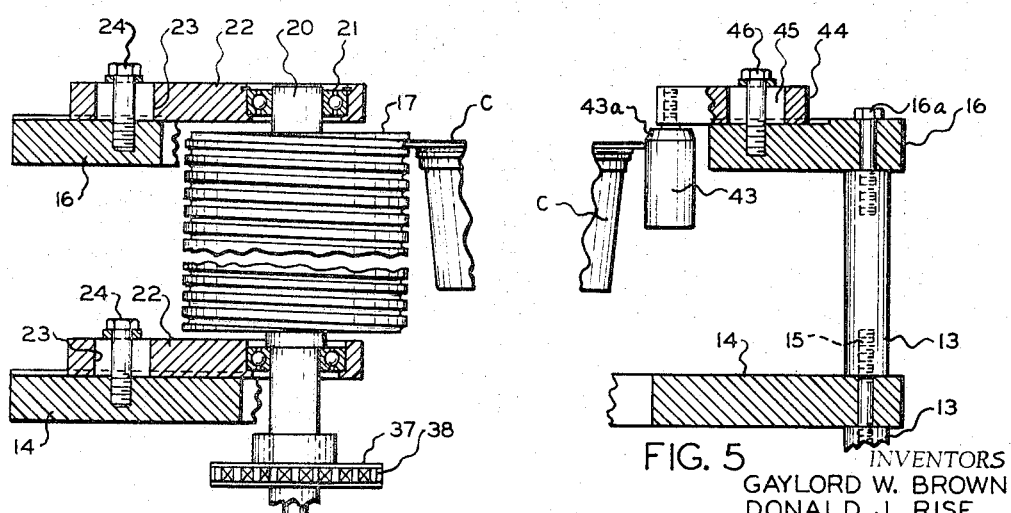
Figure 6:
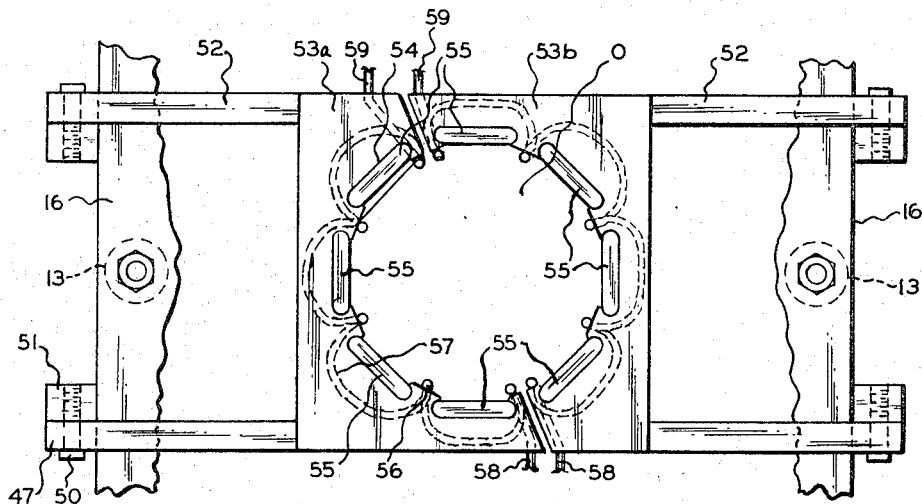
Figure 7:
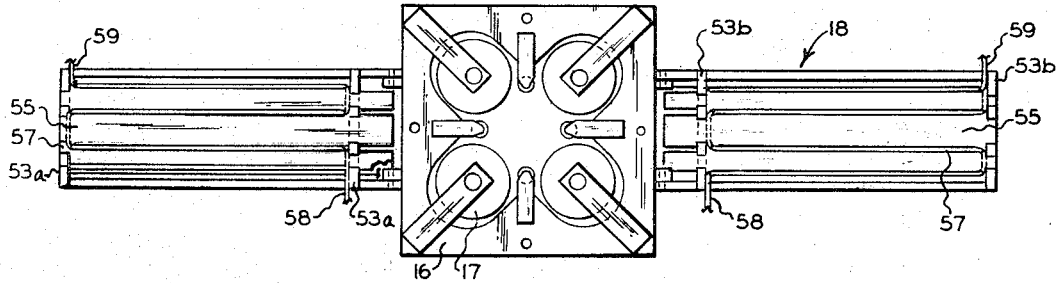
Figure 8:
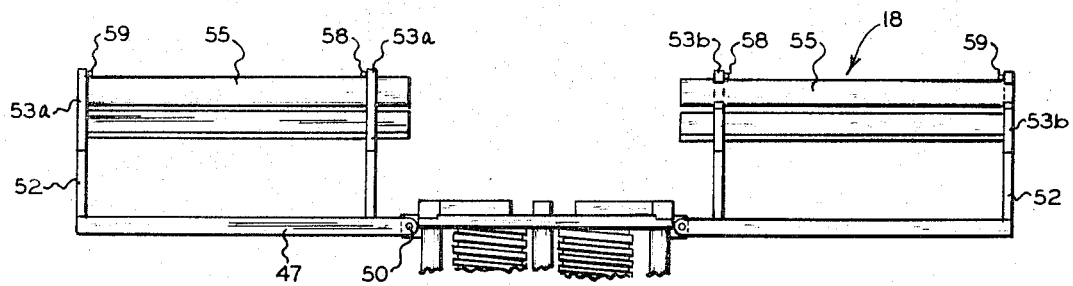
Figure 9:
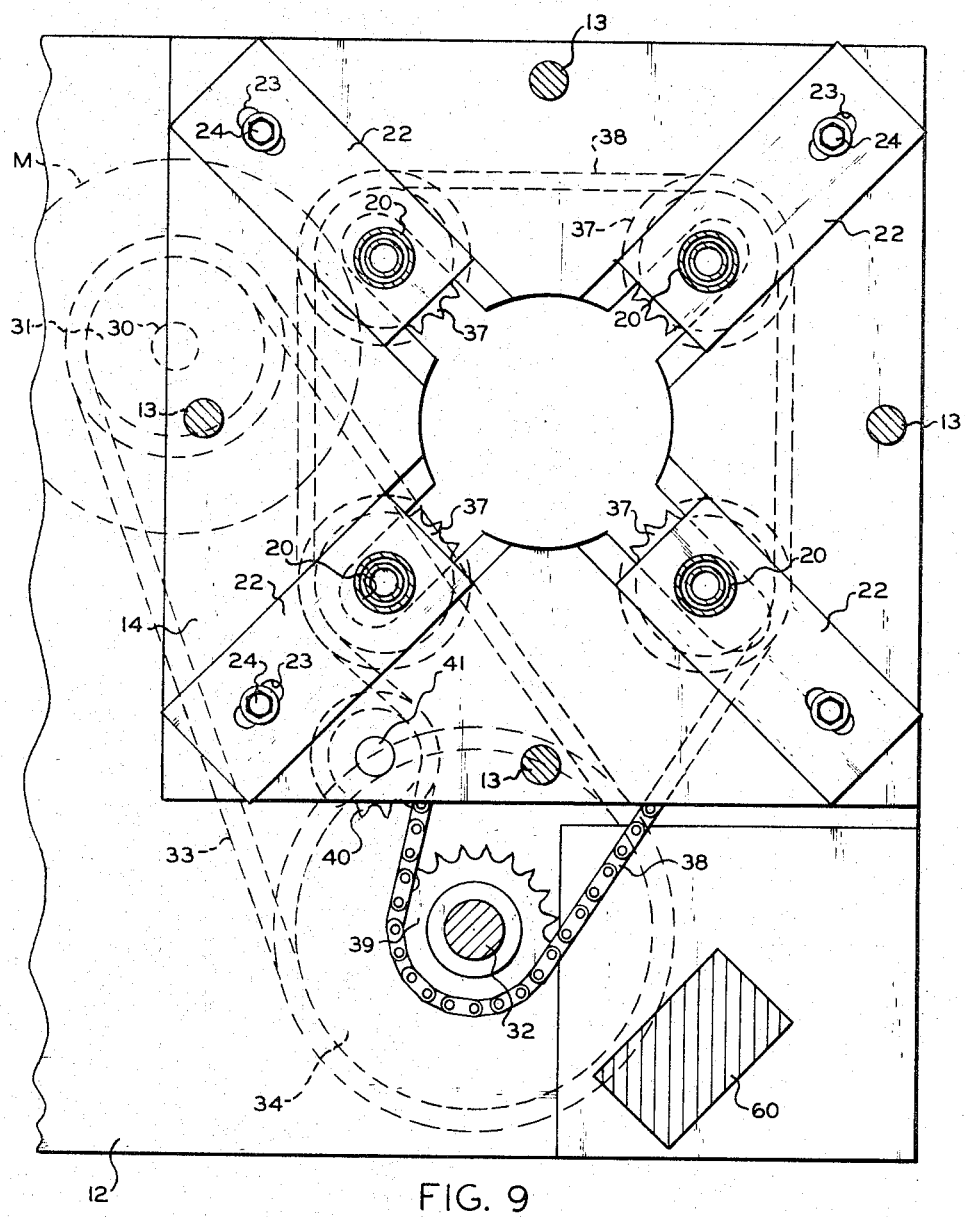
Figures 13, 14:
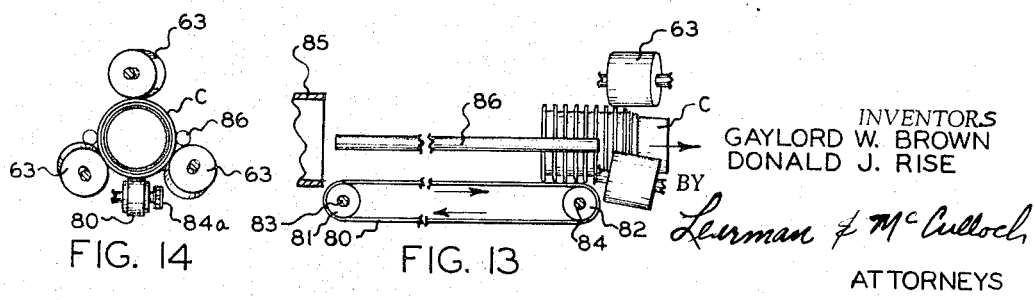
Figure 11:
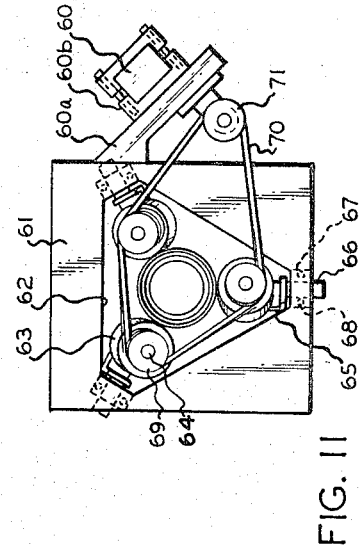
Figure 10:
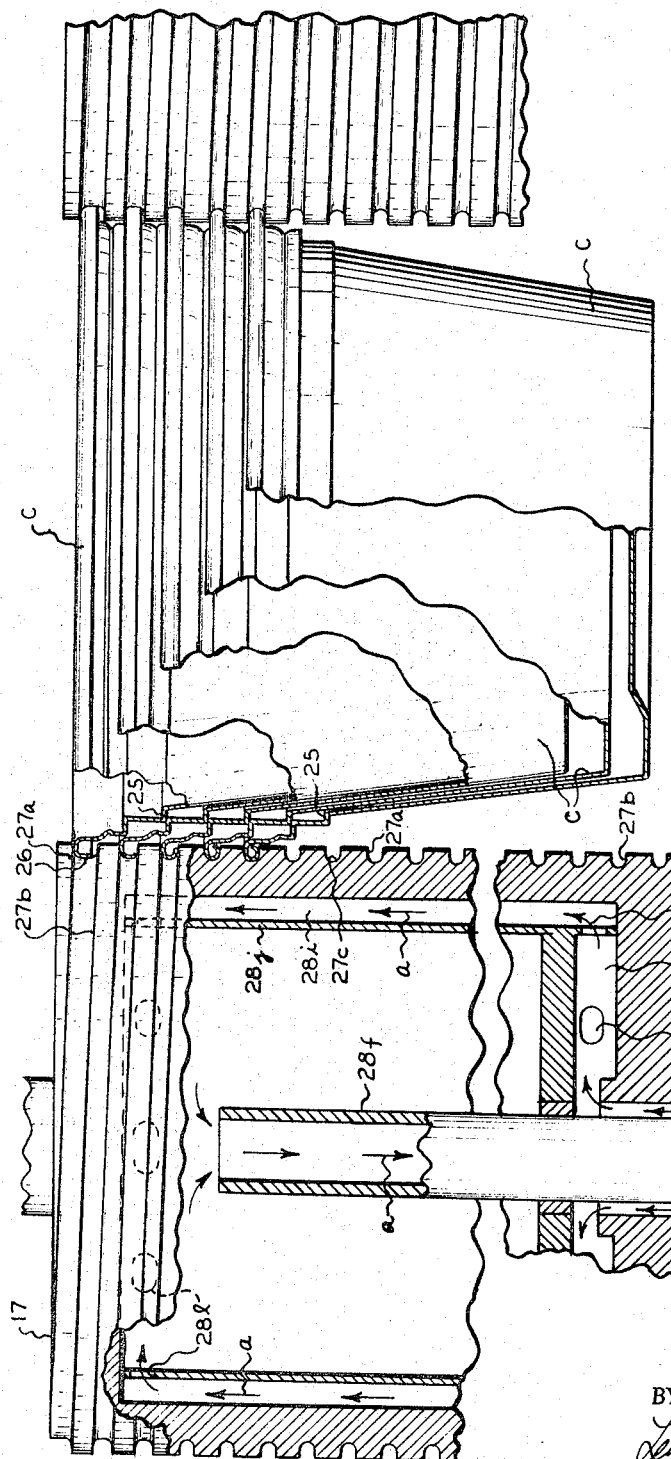
Figure 12:
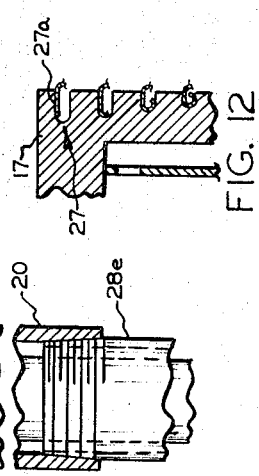

Other objects and advantages of the invention will become apparent during the course of the following description wherein:

In the drawings:
FIGURE 1 is a vertical, side elevational view of the machine for performing the operation characterized;
FIGURE 2 is a similar end elevational view thereof;
FIGURE 3 is an enlarged, top plan view taken on the line 3—3 of FIGURE 2;
FIGURE 4 is an enlarged, fragmentary, sectional, side elevational view taken on the line 4—4 in FIGURE 3;
FIGURE 5 is a similarly enlarged, fragmentary, side elevational view taken on the line 5—5 of FIGURE 3;
FIGURE 6 is an enlarged, fragmentary, top plan view taken on the line 6—6 of FIGURE 2;
FIGURE 7 is a similar top plan view with the heating elements swung down to provide access to the forming rolls;
FIGURE 8 is a side elevational, fragmentary view with the heating elements in the position in which they are shown in FIGURE 7;
FIGURE 9 is an enlarged, sectional, plan view taken on the line 9—9 of FIGURE 2;
FIGURE 10 is a fragmentary, enlarged, side elevational view illustrating the manner in which the stack of containers are fed in tightly nested condition to the forming rolls;
FIGURE 11 is a top plan view of the stack crowding rolls;
FIGURE 12 is a fragmentary view similar to FIGURE 10 of a modified forming roller as used in the same machine for curling containers with straight radial flanges;
FIGURE 13 is a fragmentary side elevational view illustrating elements which are used for feeding the containers to the feed rolls of the present machine when the machine is used horizontally;
FIGURE 14 is a fragmentary end elevational view thereof.

Referring now more particularly to the accompanying drawings, the machine includes a base table portion generally indicated by the numeral 10, which includes legs 11 and a top portion 11a. Mounted on the table top 11a is a rim forming assembly generally designated 12, including vertical lower posts 13 fixed to the top 11a which support a lower plate 14, as shown. Similar posts 13 above the plate 14 and connected with the lower posts 13 by threaded studs 15 are bolted as at 16a to a top plate 16, and it is between the plates 14 and 16 that the rim curling, threaded, forming rollers 17 are journalled in circumferentially spaced relation as indicated in FIGURE 3. The machine also includes container rim heating tunnel means generally designated 18, mounted above the forming rollers 17, and a container stack crowding and feeding rubber roll assembly generally designated 19 which is supported above the rim heating unit assembly 18.

It is to be understood that a stack of cups, such as shown in FIGURE 10, for instance, are initially fed axially through the crowding roll assembly 19 from a feed-tube, or the like, disposed above the crowding roll assembly 19. The cups are preferably fed base foremost, as shown in FIGURE 10. The rim curling machine will preferably be disposed adjacent a differential pressure forming machine for forming the cups and will preferably receive the cups directly from an air powered supply tube connected to a container cut-out machine adjacent such a forming machine, although it is possible that in some plants inventories of containers will be accumulated and then fed to the rim curling machine as needed.

As shown particularly in FIGURES 1–5, the forming rollers 17 are fixed on vertical shaft portions 20 which are journalled in bearings 21 provided in upper and lower radially adjustable support bars 22. The plates include radially elongate openings 23 through which extend bolts 24 for clamping the bars 22 to the plates 14 and 16.

As FIGURE 10 indicates, the containers C in the process of being formed include step portions 25 spaced a short distance from the rim of each container and when the containers are arranged in a stack in the relationship contemplated by the invention, the horizontal surfaces 25 will be in contact as indicated in FIGURE 10. The containers C shown are of the type which are formed with an axially extending return section 26 although it should be understood that the machine may be used with containers having a radial, terminal rim flange.

In an instance in which the containers do have the return sections 26, the groove generally designated 27 in each forming roller 17 will be of constant depth in a radial direction, but will vary in height in an axial direction. The pitch of the supper surface 27a of each groove will be constant throughout the length of each roller 17 to maintain the containers in a tightly nested stack and in a typical machine the pitch of the surface 27a of each groove 27 may be about two degrees relative to a horizontal plane. As shown in FIGURE 10, the grooves 27, while of constant depth throughout the length of the rollers 17, will decrease in height in the upper portions of the rollers 17 to progressively curl the flange 26 of each container over, and thence will remain of constant height while the formed container rims cool. The pitch angle of the lower surface 27b of each thread groove 27 will change to accomplish the decrease in depth. In FIGURES 1 and 10 a cooling unit generally designated 28 of a type which might be connected with each roller 17 is illustrated and includes an in-feed line 28a and an exit line 28b communicating with a suitable source of coolant such as the temperature controlled, recirculating unit shown in Brown's United States Patent No. 2,994,514. Each of the pipes 28a and 28b leads to and from a non-rotating housing 28c which, by means of bearings 28d, journals a tubular rotary coupling 28e which is threaded into the lower end of each lower tubular shaft portion 20. A standpipe 28f which is sufficiently smaller in diameter than the coupling 28e and shaft part 20 to form a passage 28g therebetween is supported by each housing 28c and leads to passages 28h and 28i formed between a cup-shaped member 28j, mounted within each forming roller 17, and the interior wall of the roller 17. Openings 28k and 28l in each cup member 28j permit circulation of the fluid in the flow path indicated by the arrows a, the coolant being first channeled to the interior wall of each roller 17 as shown. It is to be understood that the cooling means could possibly take other forms. Actually, the upper ends of the roller 17 will be at a somewhat greater temperature than the lower portions of the rollers 17, due to their proximity to the tunnel heating assembly 18, and the temperature of the rollers 17 will decrease progressively the further away the portion from the heating assembly 18.

The rollers 17 are driven in the same direction of rotation, which in FIGURE 3 is clockwise, by a motor M mounted on a motor support frame 29 fixed to the table legs 11. Mounted on the rotor shaft 30 of the motor M is a belt pulley 31 which drives a vertical shaft 32 via a belt 33 trained around the pulley 31 and a pulley 34 fixed on the shaft 32. The shaft 32, which is journalled in bearings 35 and 36, drives the roller shafts 20 which have sprockets 37 mounted on their lower ends as shown, via a chain 38 which is trained around the sprockets 37, and around the sprocket 39, mounted on the shaft 32. An idler sprocket 40 may be provided on a stub shaft 41, as shown in FIGURE 9.

The rims of the containers C will be heated as they proceed downwardly in a stack through the heating unit 18 to the rollers 17, and in order to enhance the frictional contact of the return section 26 of each container C with the particular roller groove 27, it is desirable to utilize vertically disposed helper rollers 43 between the thread rollers 17 to aid in preventing undue radial distortion of the upper ends of the containers. The rollers 43, which are of considerably smaller diameter so that they can fit between the rollers 17, are mounted on bars 44 having elongate radial slots 45, so that they may be adjustably secured in position by the bolts 46. The upper ends of the rollers 43 are beveled as at 43a to assist in receiving the containers. With the rollers 43 adequate frictional contact is provided to insure that the containers C are driven continuously as a stack, and do not slip. The rolls 17 and 43 are so disposed that they very slightly radially squeeze (perhaps .030") the rims of the somewhat flexible plastic containers C in a manner such that good frictional contact is provided. The rollers 17 may be formed of chrome-plated brass or of stainless steel, while the rollers 43 may be formed of stainless steel.

The heating unit generally designated 18 may be made up of a pair of identical heating sections, each of which includes vertical bars 47 connected by upper and lower cross bars 48 and 49, the bars 47 being pivotally connected as at 50 to bearing supports 51 mounted on the upper plate member 16 of the threaded roller assembly 12. Inwardly extending horizontal bar portions 52 extending from the vertical bars 47 support upper and lower mating plate members 53a and 53b, as shown in FIG. 6. It will be seen that the plates 53a and 53b are cut away so that when they are in adjoining relation, as shown in FIGURE 6, a central circular opening O is provided for passage of the stack of containers C. Recesses 54 formed in the upper and lower plates 53a and 53b support heating units 55 which are preferably of the electrically powered, resistance rod variety. Such resistance heating elements are well known in the art and may comprise U-shaped rods in vertically inversely disposed relation with electric power supplying wires connected to terminals at the bottom free ends thereof. The heating units 55 shown in FIGURES 6 and 8 are encased in a thin metal housing, and may be standard Chromalox units. Disposed between each of the units 55 is a vertically extending guide rod 56 for the stack of containers C. The guide rods 56 are so arranged that they barely contact the vertical stack of containers and do not radially compress the stack of containers proceeding downwardly, which is freely rotating in a manner which will be described. Each of the guide rods 56 is tubular and the rods are connected at their upper or lower ends by outwardly bent loops to provide a sinuous path of travel for a coolant which prevents guide rods 56 from overheating in the heating unit 18. The connecting portions are shown at 57 and coolant inlet and outlet lines are shown at 58 and 59, the lines preferably leading to a suitable recirculating, temperature controlled coolant supply source such as that disclosed in the previously mentioned Brown patent.

Mounted above the heating unit 18 is the container feeding and crowding unit generally designated 19 which is of critical importance to the success of the machine. Extending upwardly from the table top 12 is a support bar member 60 on which an upper support plate 61 is mounted. The plate 61 may be supported directly by a bracket 60a clamped to the bar 60 by the clamp assembly 60b. As shown in the plan view FIGURE 11, the upper plate 61 is cut away as at 62 to admit containers C to the dependent stack crowding rolls 63 which are journalled on shafts 64. The rolls 63 are formed of a soft rubber of a 40 to 50 durometer rating, and are circumferentially spaced apart so that they accommodate the stack of containers which are proceeding through the machine. Actually, the rollers 63 radially crowd the containers slightly (perhaps .010") so that a firm friction drive is provided. The shaft 64 for each roller 63 is rotatably supported by the plate 61 on an angle bracket 65 having a horizontally extending shaft 66, which is received in a bearing block 67. The bearing blocks 67 are preferably horizontally split so that clamp bolts 68 can clamp the shafts 66 in radially adjusted position.

Pulley members 69 can be provided on the upper ends of shafts 64 and a drive belt 70 is trained around them and around a drive pulley 71 mounted on a drive shaft 72, which is coupled to the drive shaft 32, as at 79.

The drive shafts 64 are axially tilted slightly so that the rubber rollers 63 provide a spiral feed. This tilt is on the order of, but slightly exceeds, the pitch of the surfaces 27a of thread grooves 27 so that the rate of feed of the entire stack of containers C proceeding through the crowding assembly 19, the heating unit assembly 18, and the forming thread assembly 12 is the same. The rate of speed of the surfaces of crowding rolls 63 is arranged to be the same as the rate of speed of the inner surfaces 27c of the thread grooves 27, so that the same peripheral speed is imparted to containers C proceeding past the rollers 63 as is imparted to the containers proceeding through the rolls 17. It is important to understand that the tilt of the shafts 64 is not inwardly toward the path of the stack of containers C but, rather, is lateral or tangential, and this will be apparent from the construction which is employed to adjust the degree of tilt. It is only necessary to rotate the shafts 66 in the bearings 67 after loosening the clamp screws 68 to adjust the tilt of the rollers 63. In FIGURE 11 the tilt of the roller members 63 is exaggerated for purposes of illustrating the positions of the rollers 63. In actual practice, it has been found desirable to have the tilt of the rollers 63 slightly greater than the pitch of the thread grooves 27, so that the soft rubber rollers 63 impart a more positive rotational and downward feed to the containers C, and crowd the containers so that the parts have no tendency to separate. In practice, for instance, if the pitch of the thread grooves 27 is two degrees the lateral tilt of the shafts 64 to the vertical will be about two and one-half degrees.

In operation, containers C are blown through a tube base foremost to the upper end of a stack which is formed for a short vertical distance above the roller 63. The stack will extend downwardly through the heating unit 18 and the rim curling rollers 17, and will rotate continuously as a unit. The function of the rollers 63 is to initially frictionally grip the rims of the containers and move them downwardly and rotatively. Because the rollers 63 are tilted at a slight vertical angle in the manner described, the stack of cups is vertically crowded, and the surfaces 25 are maintained in tight engagement. The rims of the containers proceeding through the heating unit 18 are heated to a formable state (about 270° F. for polystyrene, for example) by the time they reach the rollers 17 and then are progressively formed in the first few rotations downwardly between the rollers 17 in FIGURE 10. This is illustrated in FIGURE 10 and it will be noted that the rims are rolled over, rather than folded over, and the rolls formed are of relatively constant radius. This is the type of roll which is desired by the industry, but which progressively forming high speed machines have not been able to form successfully before.

As also shown in FIGURE 10, the thread grooves 27 in the intermediate and lower portions of rollers 17 are of constant height and in these portions of the grooves the rolled rims cool and return to a non-plastic state. The containers C being processed through the machine may be conventional polystyrene, polyethylene, or other plastic cups or food containers having relatively thin, flexible side walls. Because the containers are processed as a snugly nested stack unit, rather than individually, the stack serves as a mandrel for each container being formed and the flexibility of the individual containers is not a problem. In this manner, a controlled operation can be achieved which will yield substantially perfectly curled container rims at a rate of as high as 500 per minute, or more. Another advantage of processing a tightly nested stack rotating as a unit is the assurance that each container is always rotating and no hot spots or overheating of certain portions of the rim of any container will occur.

While the machine has been illustrated as forming containers with return flange sections, the same machine is capable of forming the rims of containers with straight radial flanges. In such machines the pitch of the surfaces 27a is such that after about a quarter of a revolution of the container in the rollers 17, the surfaces 27a are exerting a downward pressure on the rims sufficient to not only maintain a tightly nested stack but also to deform the rims downwardly to commence the rim curling operation. In this version of the machine the grooves 27 would be of constant height, as shown in FIGURE 12, but their depth would progressively decrease. In each embodiment of the machine the operation of the machine is initiated by starting with a plurality of containers whose rims have already been curled in the machine to furnish controlled mandrel support for the following containers with rims to be curled. Further, while we have shown the machine as vertically disposed in the drawings, it should be understood that the machine could be turned on its side so that the containers C are fed horizontally through the machine. When the machine is used horizontally, as in many instances it will be employed to facilitate the supplying and discharging of containers in the overall assembly line, charging mechanism as disclosed in FIGURES 13 and 14 is used to supply the containers to the feed rollers 63. This charging mechanism may take the form of an endless belt 80 trained around pulleys 81 and 82 which are mounted on shafts 83 and 84, respectively. One of the shafts 83 or 84 is preferably driven by the motor M or, of course, could be separately driven by a separate electric motor. Preferably, however, take-off gearing mounted on the shaft 78 will be employed to drive a sprocket 84a mounted on the shaft 84. The belt 80 is driven at a greater surface speed than the axial advancing speed of the containers C passing through the rolls 63 and serves to axially stack the containers. Thus, even though the containers C engaged by the rolls 63 are rotating, the belt 80 tends to force the following containers C into snugly nested relation with them to aid in preventing gaps from occurring in the stack. A conventional pneumatic tube 85 may be used to supply the containers to the belt 80, and stationary guide rods 86 which may be supported by the tube 85 or any convenient framework are employed to guide the containers C on the belt 80 toward the rolls 63. When the machine is used horizontally a better curling is accomplished because the stack or chimney effect of the formerly upright heating tunnel means 18 is avoided. The temperature of the plastic can accordingly be more closely controlled so that it is at just the proper temperature for curling.

It is to be understood that the form of the invention shown and disclosed is to be taken as a preferred embodiment of the invention and that various changes in the shape, size and arrangement of parts may be resorted to without departing from the spirit of the invention or the scope of the subjoined claims.

We claim:

1. Apparatus for forming rolled lips on plastic containers or the like having rims and arranged in stacked relation, the containers including projecting nesting ribs controlling the stacked relationship thereof, comprising: forming means arranged on the circumference of a circle; means for heating the rims of said containers to a deformable state; and means for feeding a stack of said containers in tightly nested condition axially through said forming means so that the said stack revolves as a unit in passing through said forming means; the forming means having portions receiving said rims configured to progressively curl said rims.

2. The combination defined in claim 5 in which said means for feeding said stack in tightly nested condition includes feed rollers mounted at a spaced distance from said plurality of rollers and likewise arranged on the circumference of a circle; and in which said means for heating the rims is disposed between said feed rollers and first mentioned rollers.

3. The combination defined in claim 2 in which means is provided for driving said feed rollers; and said feed rollers are axially inclined in a direction to move said containers toward said first mentioned rollers.

4. Apparatus for forming rolled lips on plastic containers or the like having rims and arranged in stacked relation comprising: a plurality of rollers in generally axially parallel relation and arranged on the circumference of a circle; heated tunnel means disposed upstream of said rollers and generally axially parallel therewith for heating the rims of said containers to a deformable state; means for rotating said rollers; and means disposed upstream of said tunnel means for feeding a stack of said containers in tightly nested condition spirally through said tunnel means and rollers so that the said rollers revolve said stack as a unit; at least one of the rollers having groove portions receiving said rims configured to progressively curl said rims.

5. Apparatus for forming rolled lips on plastic containers or the like having rims and arranged in a nested stack comprising: a plurality of elongated rollers in generally axially parallel relation and arranged on the circumference of a circle; means for heating the rims of said containers to a deformable state; means for rotating said rollers; means for feeding containers to said rollers; means for maintaining the stack of containers in tightly nested condition as it proceeds axially through said rollers so that the said rollers revolve said stack as a unit and the stack functions as a supporting mandrel for each individual container; at least one of the rollers having portions receiving said rims configured to progressively curl said rims.

6. Apparatus for forming rolled lips on plastic containers or the like having rims and arranged in a nested stack comprising: a plurality of rollers in generally axially parallel relation and arranged on the circumference of a circle; at least one of the rollers having spiral groove portions with a predetermined pitch angle receiving said rims and configured to progressively curl said rims; means for heating the rims of said containers to a deformable state; means for rotating said rollers; feed rollers in generally axially parallel relation and arranged on the circumference of a circle for feeding a stack of said containers in tightly nested condition axially through said first mentioned rollers so that the said first mentioned rollers revolve said stack as a unit; said feed rollers being inclined tangentially to the said circle at about the said pitch angle in a direction to feed the containers toward said first mentioned rollers; and means for revolving said feed rollers.

7. Apparatus for forming rolled lips on plastic containers or the like having rims and arranged in a nested stack comprising: a plurality of rollers in generally axially parallel relation and arranged on the circumference of a circle; at least one of the rollers having spiral groove portions with a predetermined pitch angle receiving said rims and configured to progressively curl said rims; means for heating the rim of said containers to a deformable state; means for rotating said rollers; feed rollers, in generally axially parallel relation and arranged on the circumference of a circle in substantially axial alignment with said first circle, for feeding a stack of said containers in tightly nested condition axially through said first mentioned rollers so that the first mentioned rollers revolve said stack as a unit; said feed rollers being inclined tangentially to the said circle at a pitch angle slightly greater than the said pitch angle of the groove portions of the said one roller in a direction to feed the containers toward said first mentioned rollers; and means for revolving said feed rollers.

8. Apparatus for forming rolled lips on plastic containers or the like having rims and arranged in a nested stack comprising: a plurality of rollers in generally axially parallel relation and arranged on the circumference of a circle; at least one of the rollers having spiral groove portions with a pitch angle receiving said rims and configured to progressively curl said rims; means for rotating said rollers; feed rollers in generally axially parallel relation and arranged on the circumference of a circle in substantially axial alignment with said first circle for feeding a stack of said containers in tightly nested condition axially through said first mentioned rollers so that the said rollers revolve said stack as a unit; said feed rollers being inclined tangentially to the said circle at about the said pitch angle of the groove portions of the said one roller in a direction to feed the containers toward said first mentioned rollers; temperature controlled, heating element incorporating, tunnel means in substantially axial alignment with said circles interposed between said feed rollers and first mentioned rollers; means for cooling said first mentioned rollers; and means for revolving said feed rollers.

9. The combination defined in claim 8 in which said tunnel means is formed in pivotally mounted sections swingable outwardly from a closed position in peripheral alignment with said rollers.

10. Apparatus for forming rolled lips on plastic containers or the like having rims and arranged in a nested stack comprising: a plurality of rollers in generally axially parallel relation and arranged on the circumference of a circle; at least one of the rollers having spiral groove portions receiving said rims and configured to progressively curl said rims; means for heating the rims of said containers to a deformable state; means for rotating said rollers; feed rollers in generally axially parallel relation and arranged on the circumference of a circle for feeding a stack of said containers in tightly nested condition axially through said first mentioned rollers so that the first mentioned rollers revolve said stack as a unit; said feed rollers being inclined tangentially to the said circle in a direction to feed the containers toward said first mentioned rollers; and means for revolving said feed rollers at a speed such that their peripheral surface speed is substantially the same as the peripheral surface speed of the rim engaging portions of said first mentioned rollers.

11. The combination defined in claim 10 in which said feed rollers are mounted by support means having shafts projecting substantially normally to the axes of said feed rollers; and means releasably fixing said shafts to permit the angle of inclination of said feed rollers to be changed.

12. Apparatus for forming rolled lips on plastic containers or the like having rims and arranged in a nested stack comprising: a plurality of rollers in generally axially parallel relation and arranged on the circumference of a circle; at least one of the rollers having spiral groove portions receiving said rims and configured to progressively curl said rims; means for rotating said rollers; feed rollers in generally axially parallel relation and arranged on the circumference of a circle in line with said first mentioned rollers for feeding a stack of said containers in tightly nested condition axially through said first mentioned rollers so that the said first mentioned rollers revolve said stack as a unit; said feed rollers being inclined tangentially to the said circle in a direction to feed the containers toward said first mentioned rollers; tunnel means for heating the rim of said containers to a deformable state, disposed in line between said feed rollers and first mentioned rollers; and means for revolving said feed rollers; said feed rollers and first mentioned rollers being spaced apart circumferentially to slightly radially crowd the containers, and the tunnel means being of a slightly larger diameter so as to guide but not crowd said containers.

13. The combination defined in claim 12 in which said tunnel means comprises circumferentially arranged, axially extending, electric heating elements with cooled tubular guide rods supported inboard thereof.

14. Apparatus for forming rolled lips on plastic containers or the like having rims and arranged in a nested stack comprising: a plurality of rollers in generally axially parallel relation and arranged on the circumference of a circle; at least one of the rollers having a spiral groove; means upstream of said rollers for supplying containers thereto; means for heating the rim of said containers to a deformable state; and means for rotating said rollers; the lateral upstream wall surface of said groove having a substantially constant pitch angle exerting an axial downstream force maintaining said containers in tightly nested condition as they proceed axially through said rollers so that the said rollers revolve said stack as a unit.

15. The combination defined in claim 14 in which the lateral downstream wall surface of said groove is varied to decrease the height of the groove progressively in portions of the rollers.

16. The combination defined in claim 14 in which the pitch angle of the lateral upstream wall surface of said groove is greater than that required to maintain the containers in tightly nested condition so that the rims are curled over by said upstream wall surfaces and the groove in a portion of the rollers is of progressively decreasing depth.

17. A method of forming rolled-under lips on plastic containers or the like having side walls terminating in rims and nesting controlling, projection surfaces comprising: heating the rims of said containers to render them deformable; and feeding a tightly nested stack of said containers spirally while engaging the said rims at a plurality of arcuately spaced locations and progressively curling their rims in toward their side walls.

18. The method defined in claim 17 in which said containers are fed base foremost in the direction of feed.

19. A method of forming rolled-under lips on plastic containers or the like having side walls terminating in rims and nesting controlling, projection surface comprising: axially compressing a stack of said containers into snugly nested condition so that the stack functions as a mandrel for each individual container; spirally feeding the snugly nested containers axially through a heating zone to heat the rims of said containers to render them deformable; feeding said stack spirally in a manner to rotate said stack of containers bodily while maintaining them in snugly nested condition; engaging the said rims at a plurality of arcuately spaced locations while progressively rolling their rims in toward their side walls; and holding said rims in rolled condition while cooling the rims.

20. The method defined in claim 19 in which the containers are slightly radially compressed while they are axially compressed and the rims are formed, but not while being fed through said heating zone.

21. The method defined in claim 19 in which the stack includes as leading containers a plurality of containers having rims already curled.

22. The method defined in claim 19 in which said stack of containers is fed spirally while being axially compressed and in which said containers are fed axially into said stack at a faster rate of speed than the axial feed of said stack in the said spiral path during said axial compression.

23. A method of forming turned under lips on plastic containers or the like having side walls terminating in generally radial rims and having nesting controlling, projection surfaces comprising: heating the rims of said containers to render them deformable; feeding a nested stack of said containers spirally while engaging the said rims on their upstream surfaces applying axial force in the direction of feed to the rims of individual containers, while employing the nested stack as a mandrel to prevent the movement of said containers axially in the direction of the force applied, so as to deform said rims in a downstream direction; and thereafter applying an inward radial force on said rims to curl said rims in toward the side walls of the containers.

24. Apparatus for forming rolled lips on plastic containers or the like having rims and arranged in stacked relation comprising: a plurality of rollers in generally axially parallel relation and arranged on the circumference of a circle; means for heating the rims of said containers to a deformable state; means for rotating said rollers; and means, including axially disposed, driven, endless belt means, disposed upstream of said rollers for feeding a stack of said containers in tightly nested condition spirally through said rollers so that the said rollers revolve said stack as a unit; at least one of the rollers having groove portions receiving said rims configured to progressively curl said rims.

25. The combination defined in claim 24 in which said means disposed upstream of said tunnel means includes driven feed rollers in generally axially parallel relation and arranged on the circumference of a circle to move the container positively toward the first mentioned rollers; and in which said belt means feeds said feed rollers and is driven at a greater surface speed than the axial surface speed of said feed rollers.

26. A method of forming curled lips on plastic containers or the like having side walls terminating in rims and nesting controlling surfaces comprising: feeding a stack of nested containers substantially horizontally through a heating zone not subject to "chimney" drafts to render them deformable; then feeding the stack spirally substantially horizontally while maintaining the containers in tightly nested condition and engaging the rims at a plurality of arcuately spaced locations to align them while progressively curling their rims.

References Cited
UNITED STATES PATENTS

| | | | |
|---|---|---|---|
| 3,096,546 | 7/1963 | Edwards | 18—19 X |
| 3,192,565 | 7/1965 | Rukavina | 18—19 |

WILLIAM J. STEPHENSON, *Primary Examiner.*